(12) United States Patent
Nonomura

(10) Patent No.: US 7,953,761 B2
(45) Date of Patent: May 31, 2011

(54) SYSTEM, METHOD, AND APPARATUS FOR RETRIEVING STRUCTURED DOCUMENT AND APPARATUS FOR MANAGING STRUCTURED DOCUMENT

(75) Inventor: Katsuhiko Nonomura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 936 days.

(21) Appl. No.: 11/846,042

(22) Filed: Aug. 28, 2007

(65) Prior Publication Data

US 2008/0082478 A1 Apr. 3, 2008

(30) Foreign Application Priority Data

Sep. 28, 2006 (JP) ................. 2006-264836

(51) Int. Cl.
*G06F 17/30* (2006.01)
(52) U.S. Cl. .............. 707/802; 715/255
(58) Field of Classification Search .......... 707/608, 707/674, 727, 728, 802; 715/224, 225, 254, 715/255, 260, 271
See application file for complete search history.

(56) References Cited

U.S. PATENT DOCUMENTS

| 7,054,854 | B1* | 5/2006 | Hattori et al. | ........ 707/720 |
| 2005/0086639 | A1 | 4/2005 | Min et al. | |
| 2005/0192983 | A1* | 9/2005 | Hattori et al. | ........ 707/100 |

FOREIGN PATENT DOCUMENTS

| JP | 08-305615 | 11/1996 |
| JP | 2005-018672 | 1/2005 |
| JP | 2005-208757 | 8/2005 |
| JP | 2006-228155 | 8/2006 |
| JP | 2007-206945 | 8/2007 |

OTHER PUBLICATIONS

Japanese Office Action dated Jul. 29, 2008 corresponding to U.S. Appl. No. 11/846,042, filed Aug. 28, 2007.
Liefke et al, XMill: An Efficient Compressor for XML Data, Proceedings of the 2000 ACM SIGMOD International Conference on Management of Data, 2000, pp. 153-164.

\* cited by examiner

*Primary Examiner* — Fred I Ehichioya
(74) *Attorney, Agent, or Firm* — Turocy & Watson, LLP

(57) ABSTRACT

A plan generating unit generates an execution plan based on a retrieval request. An acquiring unit acquires, from a structure-information storing unit, statistical information corresponding to a logical structure to be retrieved. An associating unit acquires, from a rule storing unit, an expression format corresponding to a condition satisfied by the statistical information acquired and associates the expression format with the execution plan. A plan executing unit represents a retrieval result obtained by executing the execution plan received from a retrieving apparatus in the expression format associated with the execution plan. A result transmitting unit transmits the retrieval result to the retrieving apparatus.

10 Claims, 15 Drawing Sheets

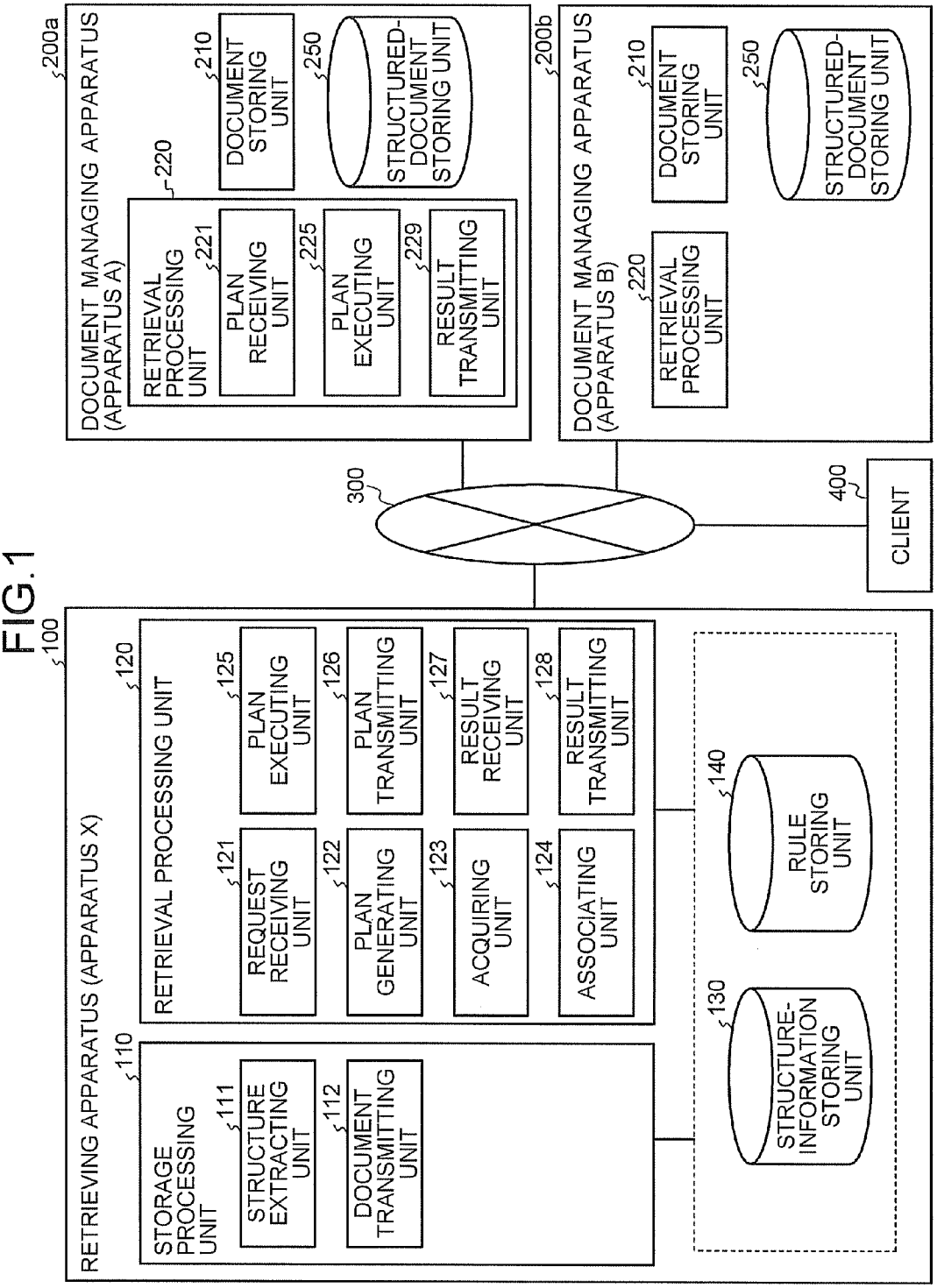

FIG.2

```
<document>
 <header>
  <title>ABOUT STRUCTURED-DOCUMENT RETRIEVING SYSTEM</title>
  <author @id="1234">TARO YAMADA</author>
  <date>20050711</date>
 </header>
 <body>
  <section>
   <title>INTRODUCTION</title>
    <subsection> IN RECENT YEARS, STRUCTURED DOCUMENTS WRITTEN
    IN XML ARE ATTRACTING ATTENTION.
    IN THIS REPORT, IMPROVEMENTS AND RETRIEVAL PERFORMANCE OF
    STRUCTURED-DOCUMENT RETRIEVING SYSTEM ARE DESCRIBED.
    </subsection>
  </section>
  <section>
   <title>STRUCTURED-DOCUMENT RETRIEVING SYSTEM</title>
    <subsection>IN THIS SECTION, SYSTEM CONFIGURATION OF
    STRUCTURED-DOCUMENT RETRIEVING SYSTEM AND...
    AS A RESULT OF VERIFICATION, ABOUT FIVE TIMES IMPROVED
    PERFORMANCE THAT IN THE PAST WAS OBTAINED.
    </subsection>
  </section>
  <section>
   <title>CONCLUSION</title>
    <subsection>IN THIS REPORT, IMPROVEMENTS AND RETRIEVAL
    PERFORMANCE OF STRUCTURED-DOCUMENT RETRIEVING SYSTEM
    ARE DESCRIBED.
    IN FUTURE, IMPROVEMENT IN REGISTRATION PERFORMANCE IS
    PLANNED.
    </subsection>
  </section>
 </body>
</document>
```

FIG.3

```
<users>
  <user id="1234">
    <name>TARO YAMADA</name>
    <office>COMPUTER DEVELOPMENT DEPARTMENT,
    COMPUTER DESIGN SECTION</office>
    <tel>123-456-7890</tel>
  </user>
  <user id="2222">
    <name>HANAKO SUZUKI</name>
    <office>COMPUTER DEVELOPMENT DEPARTMENT,
    COMPUTER MANUFACTURE SECTION</office>
    <tel>123-456-5555</tel>
  </user>
  ...
</users>
```

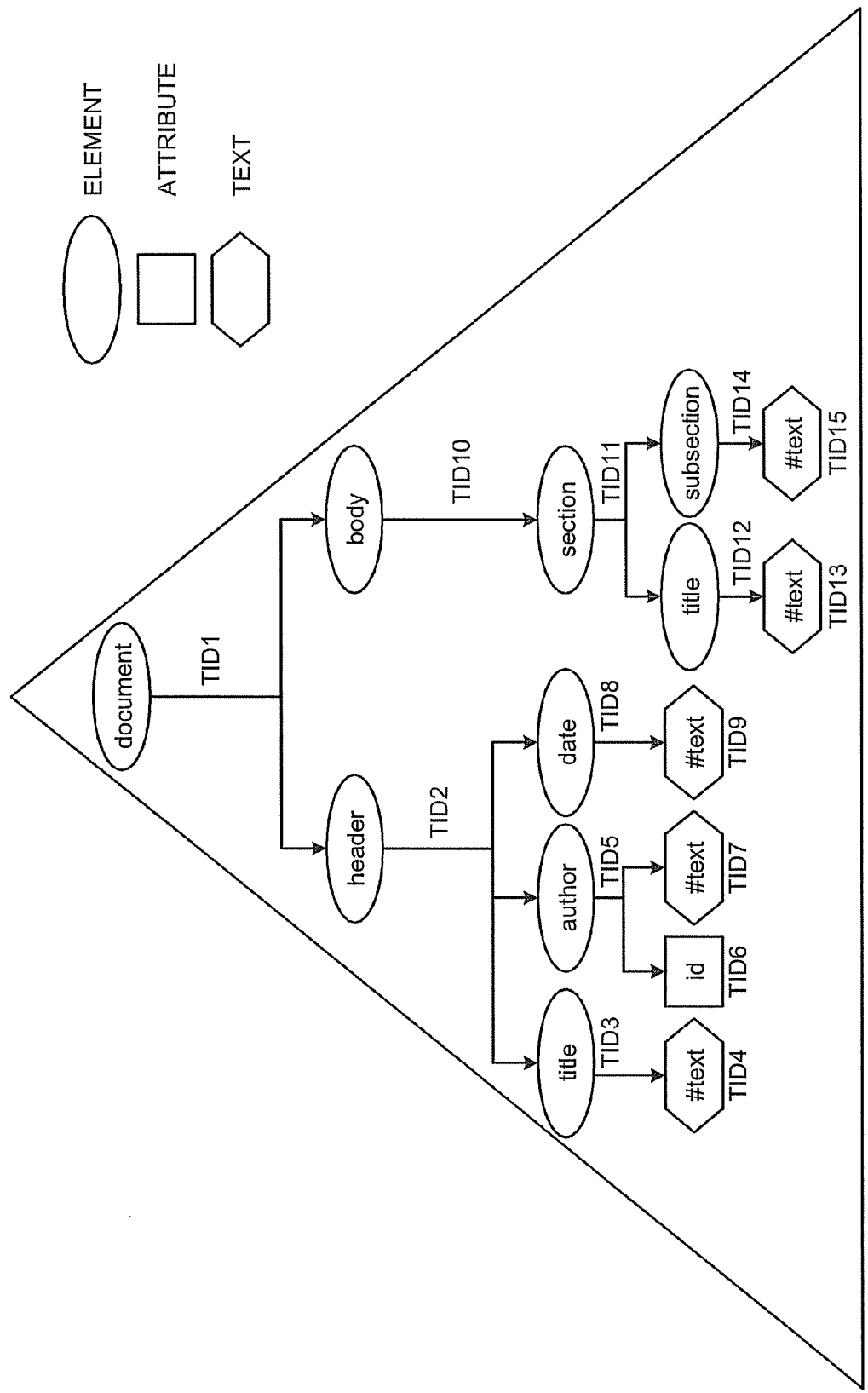

FIG.6

| TID | NODE TYPE | SYMBOL NAME | FIRST CHILD | NEXT SIBLING | DOCU-MENT ROOT FLAG | ARRANGE-MENT POSITION | AVERAGE DOCU-MENT SIZE (BYTE) | AVERAGE NUMBER OF STORED PAGES | NUMBER OF DOCU-MENTS | AVERAGE TEXT SIZE (BYTE) | TABLE FLAG | AVERAGE NUMBER OF DESCEN-DANT NODES |
|---|---|---|---|---|---|---|---|---|---|---|---|---|
| 101 | ELEMENT | users | 102 | UNDE-FINED | 1 | APPARATUS B | 31600 | 8 | 1 | 19200 | 0 | 600 |
| 102 | ELEMENT | user | 103 | UNDE-FINED | 0 | APPARATUS B | UNDE-FINED | UNDE-FINED | UNDE-FINED | 192 | 1 | 6 |
| 103 | ATTRIB-UTE | id | UNDE-FINED | 104 | 0 | APPARATUS B | UNDE-FINED | UNDE-FINED | UNDE-FINED | 8 | UNDE-FINED | 0 |
| 104 | ELEMENT | name | 105 | 106 | 0 | APPARATUS B | UNDE-FINED | UNDE-FINED | UNDE-FINED | 30 | 1 | 1 |
| 105 | TEXT | #text | UNDE-FINED | UNDE-FINED | 0 | APPARATUS B | UNDE-FINED | UNDE-FINED | UNDE-FINED | 30 | UNDE-FINED | 0 |
| 106 | ELEMENT | office | 107 | 108 | 0 | APPARATUS B | UNDE-FINED | UNDE-FINED | UNDE-FINED | 130 | 1 | 1 |
| 107 | TEXT | #text | UNDE-FINED | UNDE-FINED | 0 | APPARATUS B | UNDE-FINED | UNDE-FINED | UNDE-FINED | 130 | UNDE-FINED | 0 |
| 108 | ELEMENT | tel | 109 | UNDE-FINED | 0 | APPARATUS B | UNDE-FINED | UNDE-FINED | UNDE-FINED | 24 | 1 | 1 |
| 109 | TEXT | #text | UNDE-FINED | UNDE-FINED | 0 | APPARATUS B | UNDE-FINED | UNDE-FINED | UNDE-FINED | 24 | UNDE-FINED | 0 |

| RULE ID | CONDITION | GENERATION SOURCE | TRANSFER DESTINATION | EXPRESSION FORMAT |
|---|---|---|---|---|
| 1 | NUMBER OF DOCUMENTS =1 AND AVERAGE DOCUMENT SIZE <4000 BYTES | APPARATUS B | APPARATUS A | STORED PAGE FORMAT |
| 2 | NUMBER OF DOCUMENTS =1 AND AVERAGE DOCUMENT SIZE <40000 BYTES AND AVERAGE TEXT SIZE × NUMBER OF HITS > AVERAGE NUMBER OF STORED PAGES × PAGE SIZE | APPARATUS B | APPARATUS X | STORED PAGE FORMAT |
| 3 | TABLE FLAG=1 | APPARATUS B | APPARATUS A | TABLE FORMAT |
| 4 | AVERAGE TEXT SIZE < 100 BYTES AND NUMBER OF DESCENDANT NODES > 10 | APPARATUS B | APPARATUS X | BINARY FORMAT |

FIG.8

```
<user id="1234">
    <name>TARO YAMADA</name>
    <office>COMPUTER DEVELOPMENT DEPARTMENT, COMPUTER
     DESIGN SECTION</office>
    <tel>123-456-7890</tel>
</user>
```

```
<user id="2222">
    <name>HANAKO SUZUKI</name>
    <office>COMPUTER DEVELOPMENT DEPARTMENT, COMPUTER
     MANUFACTURE SECTION</office>
    <tel>123-456-5555</tel>
</user>
```

FIG.9

```
TID102,TID103,1234,TID104,TARO YAMADA,/,
TID106,COMPUTER DEVELOPMENT DEPARTMENT, COMPUTER
DESIGN SECTION,/,
TID108,123-456-7890,/,/
```

```
TID102,TID103,2222,TID104,HANAKO SUZUKI,/,
TID106,COMPUTER DEVELOPMENT DEPARTMENT, COMPUTER
MANUFACTURE SECTION,/,
TID108,123-456-555,/,/
```

FIG.10

| ID OF user TAG | VALUE OF id ATTRIBUTE | VALUE OF name/text() | VALUE OF section/text() | VALUE OF tel/text() |
|---|---|---|---|---|
| 1 | 1234 | TARO YAMADA | COMPUTER DEVELOPMENT DEPARTMENT, COMPUTER DESIGN SECTION | 123-456-7890 |
| 2 | 2222 | HANAKO SUZUKI | COMPUTER DEVELOPMENT DEPARTMENT, COMPUTER MANUFACTURE SECTION | 123-456-5555 |

FIG.12

```
for $rep in db("db1")/document[contains(//text(),"DATABASE")]
let $personid := $rep//author/@id
let $userinfo := db("db2")/users/user[id=$personid]
return
  <RESULT>
    <TITLE>{$rep//title/text()}</TITLE>
    <REPORTER_INFORMATION>{$userinfo}</REPORTER_INFORMATION>
  </RESULT>
```

FIG.13

```
<RESULT>
 <TITLE>STRUCTURED-DOCUMENT MANAGING APPARATUS</TITLE>
  <REPORTER_INFORMATION>
   <user id="1234"><name>TARO YAMADA</name>...
   <user id="5678"><name>HANAKO SUZUKI</name>...
  </REPORTER_INFORMATION>
</RESULT>
```

FIG.14

| ID | OPERATOR NAME | PARAMETER | DATA GENERATION | EXPRESSION FORMAT |
|---|---|---|---|---|
| 1 | LoadText | TABLE ID=10, COLUMN ID=0, TID=1, TRANSFER SOURCE=APPARATUS A, TRANSFER DESTINATION=APPARATUS X | YES | UNDEFINED |
| 2 | LoadText | TABLE ID=10, COLUMN ID=1, TID=102, TRANSFER SOURCE=APPARATUS B, TRANSFER DESTINATION=APPARATUS X | YES | UNDEFINED |
| 3 | CreateXML | TABLE ID=10 | NO | UNDEFINED |

TABLE ID=10

| $rep//title/text<br>ID OF NODE | $userinfo<br>ID OF NODE |
|---|---|
| ID1 | ID1000 |
| ID2 | ID1001 |
| ID3 | ID1002 |
| ID4 | ID1000 |
| ⋮ | ⋮ |
| ID200 | ID1008 |

FIG.18

| ID | OPERATOR NAME | PARAMETER | DATA GENERATION | EXPRESSION FORMAT |
|---|---|---|---|---|
| 1 | LoadText | TABLE ID=10, COLUMN ID=0, TID=1, TRANSFER SOURCE=APPARATUS A, TRANSFER DESTINATION=APPARATUS X | YES | TABLE FORMAT |
| 2 | LoadText | TABLE ID=10, COLUMN ID=1, TID=102, TRANSFER SOURCE=APPARATUS B, TRANSFER DESTINATION=APPARATUS X | YES | STORED PAGE FORMAT |
| 3 | CreateXML | TABLE ID=10 | NO | UNDEFINED |

FIG.19

| ID | OPERATOR NAME | PARAMETER | DATA GENERATION | EXPRESSION FORMAT |
|---|---|---|---|---|
| 1 | LoadText | TABLE ID=10, COLUMN ID=0, TID=1, TRANSFER SOURCE=APPARATUS A, TRANSFER DESTINATION=APPARATUS X | YES | TABLE FORMAT |
| 2 | LoadText | TABLE ID=10, COLUMN ID=1, TID=102, TRANSFER SOURCE=APPARATUS B, TRANSFER DESTINATION=APPARATUS X | YES | TABLE FORMAT |
| 3 | CreateXML | TABLE ID=10 | NO | UNDEFINED |

SYSTEM, METHOD, AND APPARATUS FOR RETRIEVING STRUCTURED DOCUMENT AND APPARATUS FOR MANAGING STRUCTURED DOCUMENT

CROSS-REFERENCE TO RELATED APPLICATIONS

This application is based upon and claims the benefit of priority from the prior Japanese Patent Application No. 2006-264836, filed on Sep. 28, 2006; the entire contents of which are incorporated herein by reference.

BACKGROUND OF THE INVENTION

1. Field of the Invention

The present invention relates to a structured-document managing system, a structured-document retrieving method, a structured-document retrieving apparatus, and a structured-document managing apparatus for storing and managing a large quantity of structured documents by arranging the structured documents in a group of structured document databases, which has a layered logical structure, in a distributed manner.

2. Description of the Related Art

In recent years, the advance in the information technology (IT) has made it possible to easily acquire an enormous amount of information. On the other hand, when necessary information is buried under a large amount of data, it may be impossible to make full use of the information. A large amount of information is meaningless unless it is possible to make good use of the information.

Though some pieces of the information are in a uniform format, many others are in free formats. A technology which is expected to be a core technology that enables an integrated management of these various types of information is the Extensible Markup Language (XML). The XML is a standard document description language that has flexible extensibility and cooperability. In addition, many major vendors have assured the support of the XML.

A structured document written in the XML has the following characteristics: (1) the structured document has a layered structure; (2) structure elements of the same path sometimes repeatedly appear in the document and sometimes not; and (3) a character string of a partial document could be large data.

On the other hand, there is a query language as a technology for extracting stored documents. In the field of the Relational Database (RDB), the Structured Query Language (SQL) is known as the query language. The XML Query Language (XQuery) is developed for the XML.

The XQuery is a language designed to handle collections of XML data like databases. The XQuery provides means to extract collections of data that satisfy a condition concerning a value of a structure element or a condition concerning a hierarchical structure. In addition, the XQuery allows for setting of an ambiguous condition concerning a hierarchical structure. For example, it is possible to set a condition to acquire "a 'comment' tag anywhere in descendants of a 'document'" tag", using a regular path expression.

In retrieval of structured documents such as XML documents, a structured document is often acquired as a retrieval result. A structured document may be generated in an intermediate result of retrieval processing. As an example of a simple method of generating a structured document as a retrieval result or an intermediate result of such retrieval processing, there is a method of tracing layered result data in a preorder to convert the result data into a character string. However, a data amount is large in this method.

According to one widely known manner of storing the structure documents, the structured documents are stored in plural document-storing apparatuses in a distributed manner. In retrieval processing for the structured documents arranged and stored in a distributed manner in this way, in general, it is necessary to transfer intermediate result data or the like of retrieval among the apparatuses. Since a load of transfer processing in the retrieval processing is large, there is a demand for reduction in the processing load of data transfer by, for example, reducing a data size to reduce a transfer amount.

In JP-A 2005-18672 (KOKAI) (hereinafter, "document 1"), a technology for compressing XML data generated is proposed. In a method disclosed in the document 1, a structured document is divided into a portion concerning structures and a portion concerning values with the use of a schemer (a data definition) of the structured document and tag names and attribute names are condensed as a data definition and held in the portion concerning structures to reduce a data size.

For example, since only one set of tag names of an identical path has to be held in a data definition portion, the data size is reduced. Concerning data with repetition, it is necessary to hold the number of repetitions in the value portion. However, concerning data without repetition, by holding information "no repetition" in the structure portion, it is unnecessary to hold the number of repetitions in the value portion.

In the method disclosed in the document 1, it is possible to compress the data size by contriving a data expression format. However, since it is not taken into account that redundancy of data or the like occurs in a retrieval result or an intermediate result, character string generation processing may be performed uselessly.

For example, in retrieval of structured documents, depending on a retrieval condition, character strings of a plurality of structured documents or a partial structured document may be generated from a common data area such as pages in which the structured document is stored. In such a case, in the method disclosed in the document 1, a plurality of character strings are generated individually even if the character strings are completely the same. Therefore, unnecessary character string generation processing is performed and a transfer amount is increased because the character strings redundantly generated are transferred.

SUMMARY OF THE INVENTION

According to one aspect of the present invention, a structured-document retrieving system includes a plurality of document managing apparatuses that store a plurality of structured documents, which have layered logical structures, in a distributed manner, and a retrieving apparatus that is connected to the document managing apparatuses via a network and retrieves the structured documents from the document managing apparatuses. The retrieving apparatus includes a structure-information storing unit that stores, for each of the logical structures, statistical information concerning a structural element and a value in the structured documents corresponding to the logical structures, a rule storing unit that stores a rule in which a condition concerning the statistical information and an expression format representing a character string formed by a structural element and a value are associated with each other, a plan generating unit that generates, based on a retrieval request for the structured document from a client terminal connected to the network, an execution plan of retrieval processing for the structured document, an acquiring unit that acquires, from the structure-information storing unit, the statistical information corresponding to the logical structure to be retrieved of the execution plan generated, an associating unit that acquires, from the rule storing unit, the expression format corresponding to the condition satisfied by the statistical information acquired and associates the expression format with the execution plan, a plan transmitting unit that transmits the execution plan associated with the expression format to the document managing apparatuses, a result receiving unit that receives a retrieval result, which is an execution result of the execution plan, from the document managing apparatuses, and a first result transmitting unit that transmits the retrieval result to the client terminal. Each of the document managing apparatuses includes a plan receiving unit that receives the execution plan associated with the expression format from the retrieving apparatus, a plan executing unit that executes the execution plan received and outputs a retrieval result obtained by executing the execution plan in the expression format associated with the execution plan, and a second result transmitting unit that transmits the retrieval result represented in the expression format to the retrieving apparatus.

According to another aspect of the present invention, a structured-document retrieving method is a method performed in a structured-document retrieving system including a plurality of document managing apparatuses that store a plurality of structured documents, which have layered logical structures, in a distributed manner, and a retrieving apparatus that is connected to the document managing apparatuses via a network and retrieves the structured documents from the document managing apparatuses. The structure-document retrieving method includes generating, with the retrieving apparatus, based on a retrieval request for the structured document, an execution plan of retrieval processing for the structured document, acquiring, with the retrieving apparatus, from a structure-information storing unit that stores statistical information concerning a structural element and a value in the structured documents corresponding to the logical structures for each of the logical structures, the statistical information corresponding to the logical structure to be retrieved of the execution plan generated, acquiring, with the retrieving apparatus, from a rule storing unit that stores a rule in which a condition concerning the statistical information and an expression format for expressing a character string formed by a structural element and a value are associated with each other, the expression format corresponding to the condition satisfied by the statistical information acquired and associating the expression format with the execution plan, transmitting, with the retrieving apparatus, the execution plan associated with the expression format to the document managing apparatuses, receiving, with the document managing apparatuses, the execution plan associated with the expression format from the retrieving apparatus, representing, with the document managing apparatuses, a retrieval result obtained by executing the execution plan received in the expression format associated with the execution plan;, transmitting, with the document managing apparatuses, the retrieval result represented in the expression format to the retrieving apparatus, receiving, with the retrieving apparatus, a retrieval result, which is an execution result of the execution plan, from the document retrieving apparatuses, and transmitting, with the retrieving apparatus, the retrieval result to a client terminal.

According to still another aspect of the present invention, a retrieving apparatus connected to, via a network, a plurality of document managing apparatuses that store a plurality of structured documents, which have layered logical structures, in a distributed manner, the retrieving apparatus includes a structure-information storing unit that stores, for each of the logical structures, statistical information concerning a structural element and a value in the structured documents corresponding to the logical structures, a rule storing unit that stores a rule in which a condition concerning the statistical information and an expression format representing a character string formed by a structural element and a value are associated with each other, a plan generating unit that generates, based on a retrieval request for the structured document from a client terminal connected to the network, an execution plan of retrieval processing for the structured document, an associating unit that acquires, from the rule storing unit, the expression format corresponding to the condition satisfied by the statistical information of the logical structure to be retrieved of the execution plan generated and associates the expression format with the execution plan, a plan transmitting unit that transmits the execution plan associated with the expression format to the document managing apparatuses, a result receiving unit that receives a retrieval result, which is an execution result of the execution plan, from the document managing apparatuses, and a result transmitting unit that transmits the retrieval result to the client terminal.

According to still another aspect of the present invention, a document managing apparatus connected to, via a network, a retrieving apparatus that retrieves a plurality of structured documents, which have layered logical structures, the document managing apparatus includes a document storing unit that stores the structured documents, a plan receiving unit that receives a plan for executing retrieval processing for the structured documents, which is an execution plan associated with an expression format for representing a character string formed by a structural element and a value, from the retrieving apparatus, a plan executing unit that executes the execution plan received and outputs a retrieval result obtained by executing the execution plan in the expression format associated with the execution plan, and a result transmitting unit that transmits the retrieval result represented in the expression format to the retrieving apparatus.

BRIEF DESCRIPTION OF THE DRAWINGS

FIG. 1 is a block diagram of a structure of a structured-document retrieving system according to an embodiment of the present invention;

FIG. 2 is a diagram for explaining an example of a structured document of an XML format;

FIG. 3 is a diagram for explaining another example of the structured document of the XML format;

FIG. 4 is a diagram for explaining an example of extracted structure information;

FIG. 6 is a table for explaining an example of a data structure of structure information;

FIG. 7 is a diagram for explaining an example of a data structure of rules stored in a rule storing unit;

FIG. 8 is a diagram for explaining an example of an expression format in a character string format;

FIG. 9 is a diagram for explaining an example of an expression format in a binary format;

FIG. 10 is a table for explaining an example of an expression format in a table format;

FIG. 12 is a diagram for explaining an example of query data;

FIG. 13 is a diagram for explaining an example of result data;

FIG. 14 is a table for explaining an example of an execution plan;

FIG. 18 is a table for explaining an execution plan; and

FIG. 19 is a table for explaining an example of an execution plan.

DETAILED DESCRIPTION OF THE INVENTION

Figure 5:
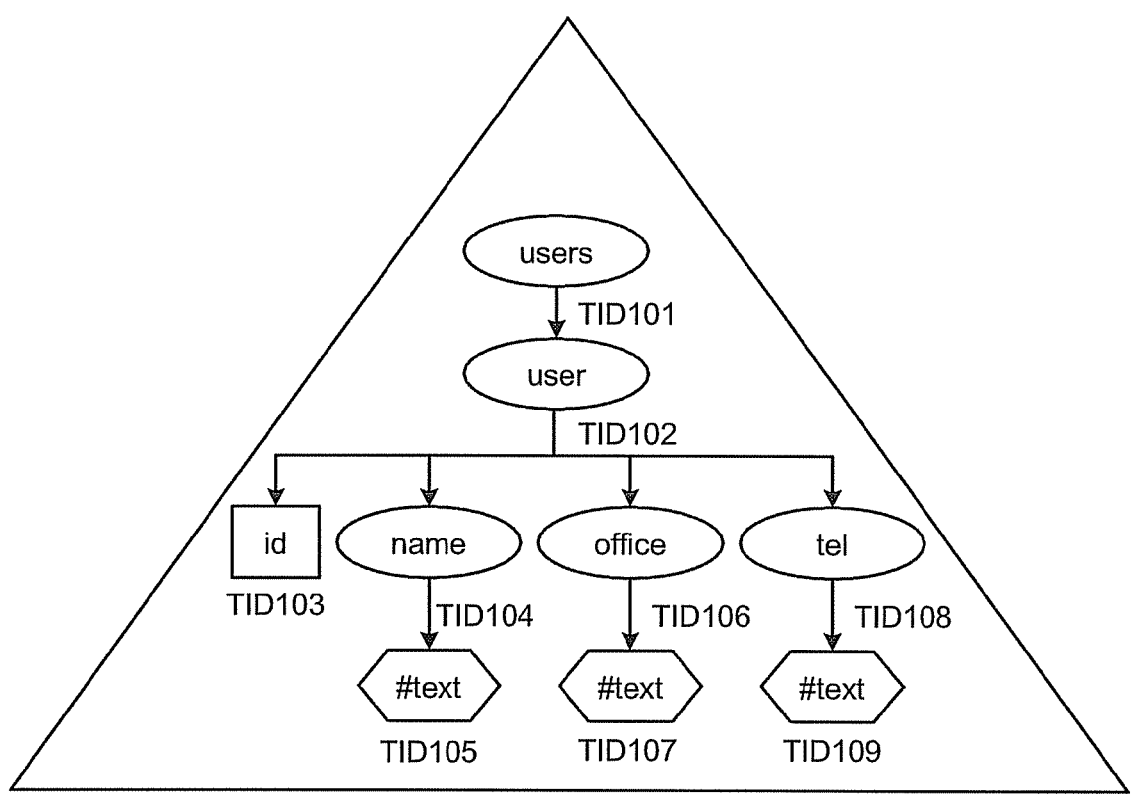
FIG. 5 is a diagram for explaining an example of extracted structure information.

Exemplary embodiments of the present invention are explained in detail below with reference to the accompanying drawings.

A structured-document retrieving system according to an embodiment of the present invention selects an expression format out of a set of a plurality of expression formats used for data expression of a structured document according to a characteristic of a retrieval request, generates an execution plan in which expression formats are allocated to operators executed in retrieval processing, generates a character string in a data format of the expression format selected, and transfers data in the data format of the expression format selected.

As shown in FIG. 1, the structured-document retrieving system according to the embodiment includes a retrieving apparatus 100, a plurality of document managing apparatuses 200a and 200b, a network 300, and a client 400.

The client 400 transmits a structured document to be stored and a retrieval request for a structured document to the retrieving apparatus 100. The client 400 is an ordinary personal computer (PC) or the like. In this embodiment, the client 400 transmits a retrieval request described in the XQuery to the retrieving apparatus 100.

The network 300 is a network that connects the retrieving apparatus 100, the document managing apparatuses 200, and the client 400. The network 300 may be any kind-of network such as the Internet or a virtual private network (VPN). A network that connects the client 400 and the retrieving apparatus 100 and a network that connects the document managing apparatuses 200 and the retrieving apparatus 100 may be separate networks.

The retrieving apparatus 100 retrieves a structured document from the document managing apparatuses 200. In the following explanation, as shown in the figure, the retrieving apparatus 100 may be referred to as an apparatus X and the document managing apparatuses 200a and 200b may be referred to as apparatuses A and B, respectively. Since the document managing apparatuses 200a and 200b have the same structure, the document managing apparatuses 200a and 200b may be simply referred to as the document managing apparatuses 200.

The structured-document retrieving system according to the embodiment includes at least two document managing apparatuses 200. The number of document managing apparatuses 200 is not limited to two.

The retrieving apparatus 100 includes a storage processing unit 110, a retrieval processing unit 120, a structure-information storing unit 130, and a rule storing unit 140.

The structure-information storing unit 130 stores structure information extracted from a structured document of the XML format.

Structured-documents of the XML format employed in the embodiment are explained below.

As shown in FIG. 2, the structured document of the XML format is often divided into bibliographic information between <header> tags and body information between <body> tags. Further, the structured document includes information repetitiously appears therein, such as a <section> tag shown in FIG. 2.

A portion of data enclosed and defined by tags in the XML is called an element, which is a data unit of the XML. For example, data including a <document> tag and a </document> tag and placed between the tags forms one element.

The element may include an attribute which indicates additional information, for example, whether the data can be omitted, or can be repeated. In FIG. 2, an author element includes an "id" attribute.

A content of information enclosed by a start tag and an end tag in the element is referred to as text in the following explanation. For example, "20050711" is the text of a date element in FIG. 2.

Structure information is extracted from an XML-format structured document, and includes information on names of tags, a hierarchical relation among the tags, the number of repetitions, and the like. In the embodiment, the element, the attribute, and the text are structural elements constituting the structure information of the structured document.

FIG. 3 shows an example of an XML document in which user information on users who use the system is stored. FIG. 2 is an example of an XML document of a report created by a user.

FIG. 4 is a diagram of one example of the structure information extracted from the structured document shown in FIG. 2. In FIG. 4, the structure information is represented by a tree structure. Elliptical nodes are nodes corresponding to elements (hereinafter, "element nodes"), square nodes are nodes corresponding to attributes (hereinafter, "attribute nodes"), and hexagonal nodes are nodes corresponding to texts (hereinafter, text nodes).

In the following explanation, "node" is used as a term representing a node of a general tree structure. Therefore, when the structure information is represented by the tree structure as in FIG. 4, structural elements are nodes. When a structured document is represented by a tree structure as described later, partial character strings forming parts of the structured document are nodes.

As shown in the figure, TIDs, which are identifiers for uniquely identifying structural elements, are allocated to the structural elements. In FIG. 4, for example, TID1 is allocated to a structural element corresponding to a "document" tag of a path "/document", TID2 is allocated to a structural element corresponding to a "header" tag of a path "/document/header", and TID3 is allocated to a structural element corresponding to a "title" tag of a path "/document/header/title".

A plurality of "section" tags of a path "/document/body/section" could be included in the structured document. However, structural elements of the identical path are contracted into one and allocated with TID11. When plural structured documents have different structures, structure information of respective structured documents are superimposed, and generalized structure information encompassing all the structured documents is formed.

FIG. 5 is a diagram for explaining an example of structure information extracted from the structured document shown in FIG. 3. As shown in FIG. 5, structure information is defined so as to indicate that an identifier (id), a user name (name), a department (office), and a telephone number (tel) are stored for each user.

Structure information stored in the structure information storing unit 130 is explained below. A table of FIG. 6 is an example of structure information extracted from the structured document shown in FIG. 3.

In the example shown in FIG. 6, besides relations among structural elements in a tree structure such as a parent-child relation and a sibling relation, information on the document managing apparatus 200 in which the structured document is stored and statistical information concerning the structured document are held.

As shown in FIG. 6, the information on the relations among structural elements stored as the structure information includes: a TID; a node type representing a type of a node; a symbol name representing a name of a structural element; a TID of a structural element equivalent to a first child; a TID of a structural element equivalent to a next sibling; and a document root flag. As the information on the document managing apparatus 200 in which the structured document is stored, an arrangement position is stored. As the statistical information concerning the structured document, an average document size, an average number of stored pages, the number of documents, an average text size, a table flag, and an average number of descendant nodes are stored.

The document root flag means information representing whether a node is a root node of the tree structure of the structured document. When the node is the root node, 1 is set in the document root flag. Otherwise, 0 is set in the document root flag. In the statistical information, the average document size, the average number of stored pages, and the number of documents are set in only a TID corresponding to the root node.

The average document size represents an average size of structured documents. The average number of stored pages represents an average number of stored pages of the structured document represented in the stored page format. Details of the stored page format are described later. The number of documents means the number of structured documents corresponding to the structure information. In the embodiment, since all pieces of user information are stored in one XML document shown in FIG. 3, 1 is set in the number of documents as shown in FIG. 6.

In the statistical information, the average text size, the table flag, and the average number of descendant nodes are set in association with a TID of each node. The average text size represents, an average size of character strings (texts) included in the node. The table flag is a flag concerning the number of nodes corresponding thereto. For all documents, when element nodes corresponding thereto do not have child nodes of redundant names, 1 is set in the table flag. For other element nodes, 0 is set in the table flag. For the attribute node and the text node, the table flag is undefined. The average number of descendant nodes represents an average of the numbers of nodes present below a node corresponding thereto.

A frequency of update of the structure information is considered to be relatively low compared with those of document information and index information. Therefore, even in a system in which structure information is updated online, it is possible to store the structure information on a memory of each of apparatuses and share the structure information while keeping consistency thereof.

Referring back to FIG. 1, the rule storing unit 140 stores rules determining an expression format for expressing a character string generated as a retrieval result when conditions concerning the statistical information of the structure information are satisfied.

The structure-information storing unit 130 and the rule storing unit 140 may be any storage medium generally used such as a hard disk drive (HDD), an optical disk, a memory card, or a random access memory (RAM).

As shown in FIG. 7, the rule storing unit 140 stores a rule ID for identifying a rule, a condition for applying the rule, a generation source representing an apparatus as a generation source of data, a transfer destination representing an apparatus as a transfer destination of the data, and a selected expression format in association with one another.

The condition for applying a rule is defined using information on query data, information on a structured document group stored, and information on an intermediate result of retrieval processing. For example, in the figure, "the number of documents" and "a document size" included in a condition of a rule ID=1 and "an average text size" and "an average number of stored pages" included in a condition of a rule ID=2 are the information on a structured document group stored. "The number of hits" included in a condition of a rule ID=2 is the information on an intermediate result of retrieval processing.

Any expression format used for representing XML data may be designated as the expression format. In the embodiment, it is possible to designate a character string format, a binary format, a table format, and a stored page format as main expression formats. The expression formats are explained below with the user information in FIG. 3 as an example.

FIG. 8 is a diagram for explaining an example of the expression format in the character string format. The character string format is a format directly representing a character string included in a structured document. In the figure, data of two people are represented in a character string format of the XML in association with the user information in FIG. 3. In the character string format of the XML, there are rules that, for example, a start tag name is placed between a character "<" and a character ">" and a start tag and an end tag form a pair. Thus, a size of data tends to be large.

FIG. 9 is a diagram for explaining an example of the expression format in the binary format. The binary format is a format representing information of a character string using data other than the character string. In the figure, an example of the binary format employing a method of representing a tag name and an attribute name using predetermined IDs is shown.

Specifically, in the binary format in the figure, a structured document is divided into a portion concerning structures and a portion concerning values, tag names and attribute names are represented by TIDs, and the IDs and the values are arranged in an order obtained by tracing structural elements of XML data in a preorder. As an end tag name, characters "/" are arranged to indicate only a position of an end tag. The values are grouped for each of the structural elements of the same path and a text compression tool is designated for each of the groups to compress data. For ease of explanation, the data before the compression is shown in the figure.

In the binary format, a size of data is small compared with that in the character string format. However, it is difficult to handle access to partial data and update of the partial data.

FIG. 10 is a diagram for explaining an example of the expression format in the table format. The table format is a table-like format in which definition information of a data type is held in each column and values corresponding to the definition information are set in each row as in a general RDB.

In the figure, as an example, "an ID of a "user" tag", "a value of an "id" attribute", and the like are set as definition information and user information for two people corresponding to the definition information is designated in each row.

In the table format, there are a plurality of structural elements with the same tag name as child elements of a certain structural element. In other words, in the case of XML data having repeatability, values concerning structural elements of the XML data have to be redundantly held.

Figure 11:
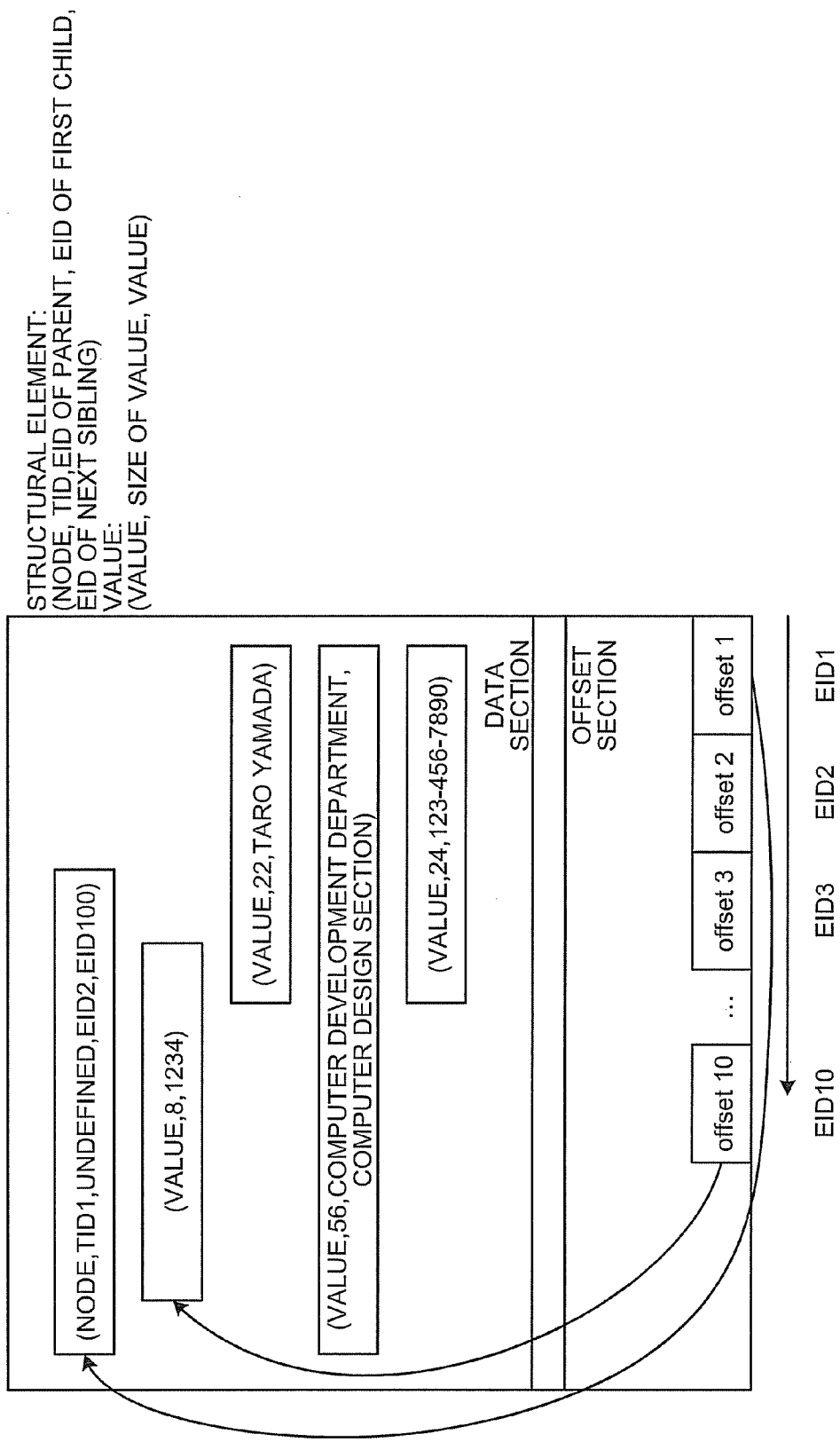
FIG. 11 is a diagram for explaining an example of an expression format in a stored page format.

FIG. 11 is a diagram for explaining an example of the expression format in the stored page format. The stored page format is a format for storing a character string in a stored page of a fixed length size. As shown in the figure, the stored page is formed by a data section and an offset section. Data concerning structural elements and values are arranged in the data section. In the offset section, positions where respective data are arranged (offsets from a page top) are arranged from the end of the page in an order of EIDs, which are IDs allocated to the respective data.

There are several access patterns for data used in retrieval processing. Thus, conditions corresponding to the access patterns and expression formats suitable for the access patterns are designated as rules in the rule storing unit 140. The access patterns for data are explained below.

(1) Data of a Common Structure for Retrieval Results

In retrieval of a structured document, it is possible to designate query data for obtaining a retrieval result in a format of a structured document as described above. For example, it is possible to designate query data for obtaining a retrieval result in which a title of a report in the retrieval result is placed between "<title>" tags, an ID of a user is placed between "<reporter information>" tags, and the entire retrieval result is placed between "<result>" tags. In such a case, portions of the tags are data of a common structure for all retrieval results. Concerning such data of a common structure for retrieval results, if the data is created only once and referred to when the respective retrieval results are created, it is possible to prevent useless character string generation processing.

(2) Data of an Entire Document or a Specific Part in the Document

In this case, data of a specific structural element and structural elements subordinate to the structural element is a retrieval result. As an example, there is retrieval using an XPath. When data transfer is performed between apparatuses for data of such a pattern, it is possible to reduce a transfer size if the data transfer is performed in the binary format rather than the character string format.

(3) Data of a Non-Specific Part of a Document

In this case, there are a plurality of retrieval results. Parts of a structured document used in the retrieval results are different in the respective retrieval results. For example, when user information is retrieved from one XML document (FIG. 3) in which the user information is stored as in the embodiment, redundant user information may be retrieved depending on query data.

Data is managed in a unit of table in an RDB and data is managed in a unit of object in an object oriented database. However, data is often managed in a unit of document in the structured-document retrieving system. Therefore, when data in the same document is accessed frequently, the access is efficient if a page stored in the document (a stored page) is directly referred to.

In view of the above, it is considered to be possible to reduce redundant processing of character string generation and data transfer by selecting an expression format in a data format from a viewpoint of a data access pattern and a data size used in the retrieval processing and performing buffer management for data and data transfer in the data format selected.

Referring back to FIG. 1, the storage processing unit 110 performs processing for storing structured documents in structured-document storing units 250 and includes a structure extracting unit 111 and a document transmitting unit 112.

Storage processing for a structured document is divided into two phases. In a first phase, processing for extracting structure information of an inputted structured document from the document and storing the structure information in the structure-information storing unit 130 and transmitting the structured document to each of the document managing apparatuses 200 with reference to the structure information is executed. The first phase is executed by the structure extracting unit 111 and the document transmitting unit 112.

A second phase is executed by a document storing unit 210 on each of the document managing apparatuses 200. In the second phase, processing for storing the structured document transmitted in the structured-document storing unit 250 is executed.

The structure extracting unit 111 extracts a structural element forming the structured document from the document. In the case of the XML, it is possible to apply any method conventionally used such as a method of creating an object tree according to a document object model (DOM).

When the structure extracting unit 111 extracts new structure information not included in structure information already stored in the structure-information storing unit 130, the structure extracting unit 111 stores the new structure information in the structure-information storing unit 130.

The document transmitting unit 112 transmits the structured document to each of the document managing apparatuses 200 according to information on arrangement positions included in the structure information stored in the structure-information storing unit 130.

As a method of determining the document managing apparatus 200 in which the inputted structured document is stored, it is possible to apply any method conventionally used such as value range division, round robin, and capacity distribution. To realize fast retrieval, index information may be generated and stored in a not-shown index storing unit.

The retrieval processing unit 120 performs retrieval processing for the structured document stored in the structured-document storing unit 250 of the document managing apparatus 200. The retrieval processing unit 120 includes a request receiving unit 121, a plan generating unit 122, an acquiring unit 123, an associating unit 124, a plan executing unit 125, a plan transmitting unit 126, a result receiving unit 127, and a result transmitting unit 128.

The request receiving unit 121 receives query data transmitted from the client 400. FIG. 12 is a diagram of an example of query data conforming to a query description method based on the XQuery.

It is assumed that a report shown in FIG. 3 is stored in a structured document DB "db1" and user information shown in FIG. 4 is stored in a structured document DB "db2". In this case, the query data shown in FIG. 12 means that "concerning a report including a character string "database" in any one of documents in the structured document DB "db1", user information equal to an attribute value of a path "//author/@id" is obtained from a path "/users/user" of a hierarchical tree of another structured document DB "db2" and a list of information titles of reports and reporters is obtained".

In such retrieval processing using query data, zero or more sets of an ID of a structural element of a "document" tag and IDs of structural elements of one or more "user" tags are obtained and outputted as result data. In FIG. 13, an example of result data including user information of two users acquired from the user information shown in FIG. 3 is shown.

When a query language such as the XQuery is used, it is possible to acquire result data in a unit of structure document or a unit of partial document and generate a structured document of a new format by collecting one or more partial documents.

Referring back to FIG. 1, the plan generating unit 122 generates, according to the query data received by the request receiving unit 121, an execution plan for the retrieval processing including a plan for requesting each of the document managing apparatus 200 to retrieve data and a plan for acquiring a retrieval result for the query data from data returned by the document managing apparatus 200.

As shown in FIG. 14, the execution plan is represented by a string of one or more codes. Each of the codes includes an ID for identifying the code, a name of an operator to be executed, parameters, data generation, and an expression format. Details of the execution plan are described later. Since the expression format is set by the associating unit 124 described later, the expression format is set as undefined at a point when the plan generating unit 122 generates the execution plan.

The plan generating unit 122 may generate an execution plan for generating an intermediate result of the retrieval processing and, after acquiring the intermediate result, generate a following execution plan with reference to contents of the intermediate result. This makes it possible to perform dynamic plan generation and allocation of expression formats using the intermediate result of the retrieval processing.

Referring back to FIG. 1, the acquiring unit 123 acquires, from the structure-information storing unit 130, statistical information corresponding to a structural element to be retrieved in each of the codes in the execution plan generated by the plan generating unit 122.

For example, concerning a code of ID=2 in FIG. 14, since a TID of a structural element to be retrieved is 102, the acquiring unit 123 acquires an average text size=94 and the like from the structure information shown in FIG. 6. The acquiring unit 123 also acquires statistical information (the number of documents=1, etc.) of the entire structured document in which TID=102 is included.

The associating unit 124 judges, using the statistical information acquired by the acquiring unit 123, whether a condition of a rule stored in the rule storing unit 140 is satisfied. When the condition is satisfied, the associating unit 124 acquires an expression format corresponding to the condition from the rule storing unit 140 and associates the expression format with each of the codes of the execution plan.

The plan executing unit 125 performs retrieval of data from each of the document managing apparatuses 200, creation of a retrieval result returned to the client 400, and the like by executing the operators corresponding to the respective codes in the execution plan in order.

When the execution plan is retrieval processing for the structured document stored on each of the document managing apparatuses 200, the plan transmitting unit 126 transmits the execution plan to the document managing apparatus 200.

The result receiving unit 127 receives the retrieval result of data according to the execution plan executed in each of the document managing apparatuses 200 from the document managing apparatus 200.

The result transmitting unit 128 transmits the retrieval result created by the plan executing unit 125 to the client 400 that transmitted the retrieval request.

The document managing apparatuses 200 store structured documents in a distributed manner, perform retrieval of the structured documents stored therein in response to a request from the retrieving apparatus 100, and return retrieval results to the retrieving apparatus 100. Each of the document managing apparatuses 200 includes the document storing unit 210, a retrieval processing unit 220, and the structured-document storing unit 250.

The structured-document storing unit 250 stores the structured document of the XML format shown in FIG. 2 or 3. The document storing unit 210 stores the structured document transmitted by the document transmitting unit 112 of the retrieving apparatus 100 in the structured-document storing unit 250.

The structured-document storing unit 250 may be any storage medium generally used such as an HDD, an optical disk, a memory card, or a RAM.

The retrieval processing unit 220 performs retrieval processing for the structured document stored in the structured-document storing unit 250 according to an execution plan of retrieval transmitted from the retrieving apparatus 100. The retrieval processing unit 220 includes a plan receiving unit 221, a plan executing unit 225, and a result transmitting unit 229.

The plan receiving unit 221 receives an execution plan for retrieving the structured document stored on the document managing apparatus 200 from the retrieving apparatus 100.

The plan executing unit 225 executes the execution plan received and executes character string generation processing to represent a retrieval result obtained as a result of the execution of the execution plan in an expression format associated with the execution plan.

The result transmitting unit 229 transmits a retrieval result generated in an expression format associated therewith to the retrieving apparatus 100. In this way, when data is exchanged with other apparatuses, data of various expression formats can be transferred. Therefore, the document managing apparatus 200 to which the data are transferred uses an access function capable of referring to the data of the respective expression formats. For example, an interface through which even the document managing apparatus 200 at a transfer destination can refer to data of the stored page format is provided.

Figure 15:
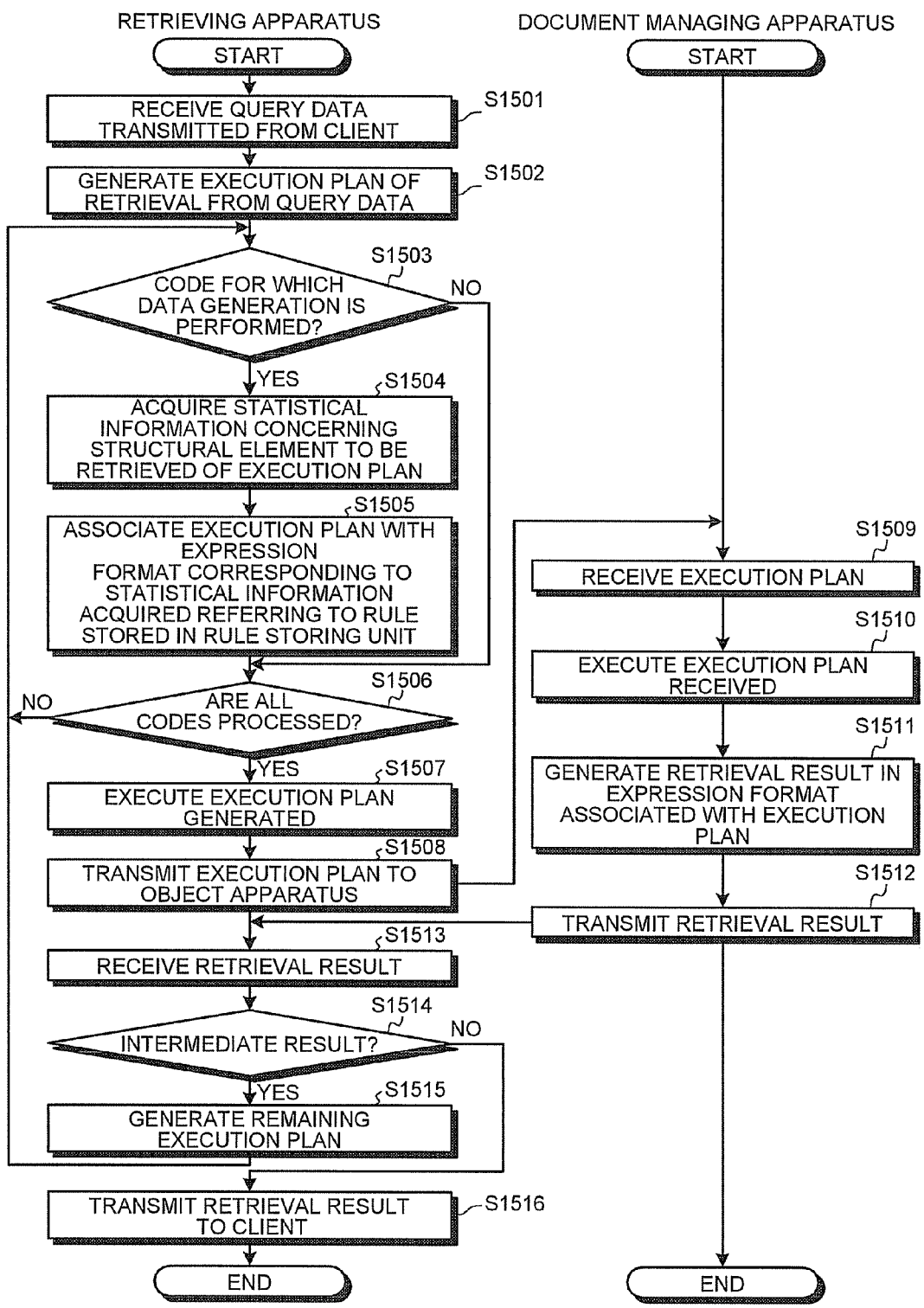
FIG. 15 is a flowchart for explaining an overall flow of structured document retrieval processing according to the embodiment.

FIG. 15 is a flowchart for explaining structured document retrieval processing by the structured-document retrieving system according to the embodiment described above.

First, the request receiving unit 121 receives query data transmitted from the client 400 (step S1501). The plan generating unit 122 creates an execution plan for retrieval from the query data received (step S1502).

The acquiring unit 123 judges whether each of codes of the execution plan is a code for which data generation is performed, i.e., whether the "data generation" space is "Yes" (step S1503).

When data generation is performed (YES at step S1503), the acquiring unit 123 acquires statistical information concerning a structural element to be retrieved of the execution plan (step S1504). For example, for the code of ID=2 in FIG. 14, the acquiring unit 123 acquires the average text size=192, the table flag=1, and the average number of descendant nodes=6 from the structure information shown in FIG. 6 as statistical information corresponding to the TID=102 of the structural element to be retrieved. The acquiring unit 123 acquires the average document size=31600, the average number of stored pages=8, and the number of documents=1 as statistical information concerning a root node corresponding to the code.

The associating unit 124 associates an expression format corresponding to the statistical information acquired with the execution plan referring to the rules stored in the rule storing unit 140 (step S1505). When there are no rules with matching conditions, the associating unit 124 associates the table format with the execution plan as a default expression format.

The acquiring unit 123 judges whether all the codes have been processed (step S1506). When all the codes have not been processed (NO at step S1506), the acquiring unit 123 repeats the processing for the next code (step S1503).

When all the codes have been processed (YES at step S1506), the plan executing unit 125 executes the execution plan generated (step S1507). In the case of the execution plan for performing retrieval of a structured document in the document managing apparatus 200, the plan transmitting unit 126 transmits the execution plan to the document managing apparatus 200 from which the structural element is retrieved (step S1508).

In the document managing apparatus 200, the plan receiving unit 221 receives the execution plan (step S1509) and the plan executing unit 225 executes the execution plan received (step S1510). In this case, the plan executing unit 225 generates a retrieval result in an expression format associated with the execution plan (step S1511). The result transmitting unit 229 transmits the retrieval result generated to the retrieving apparatus 100 (step S1512).

The result receiving unit 127 of the retrieving apparatus 100 receives the retrieval result transmitted from the document managing unit 200 (step S1513). The plan generating unit 122 judges whether the retrieval result received is an intermediate result of the retrieval processing (step S1514). When the retrieval result is an intermediate result (YES at step S1514), the plan generating unit 122 generates a remaining execution plan corresponding to the intermediate result (step S1515). This step is not essential. The intermediate result may be processed according to an execution plan generated in advance.

When the retrieval result is not an intermediate result at step S1514 (NO at step S1514), the result transmitting unit 128 transmits the retrieval result to the client 400 (step S1516) and finishes the structured document retrieval processing.

The plan executing unit 125 creates the retrieval result transmitted to the client 400 in a format (the XML format, etc.) for transmission to the client 400 according to the execution plan.

A specific example of the structured document retrieval processing by the structured-document retrieving system according to the embodiment is explained below. Structured document retrieval processing for structured documents arranged in the two document managing apparatuses 200*a* and 200*b* in a distributed manner is explained as an example.

Figures 16, 17:
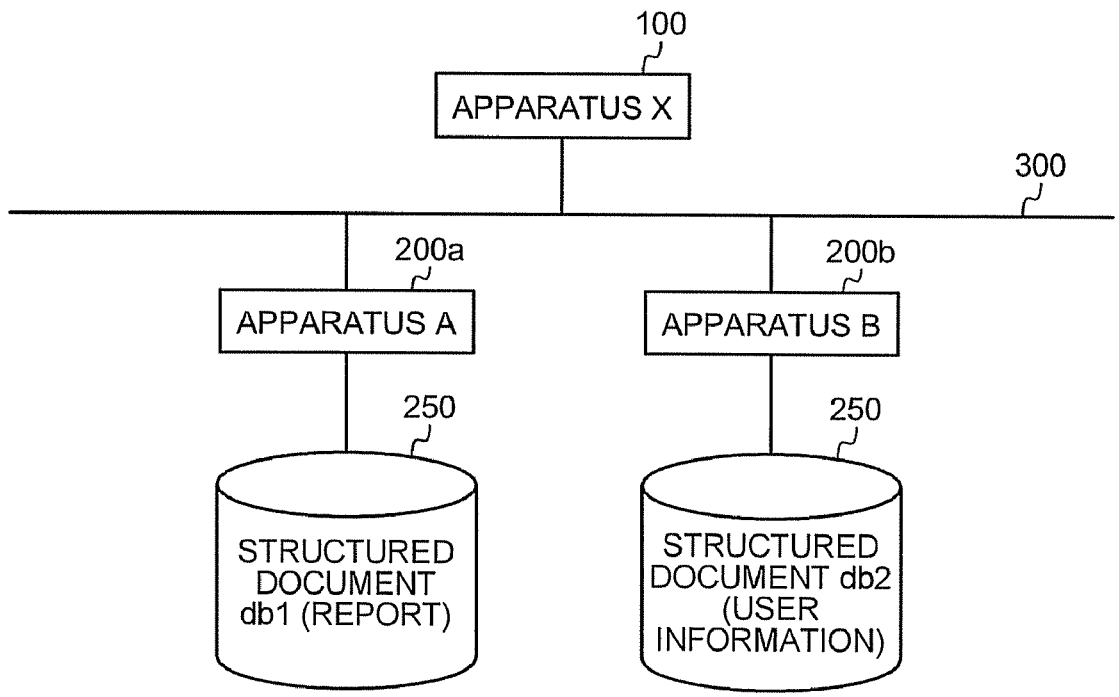
FIG. 16 is a diagram for explaining an example of a distributed arrangement of structured documents.
FIG. 17 is a diagram for explaining an example of a table showing an intermediate result.

FIG. 16 is a diagram for explaining an example of a distributed arrangement of the structured documents in this example. As shown in the figure, it is assumed that an apparatus X is the main retrieving apparatus 100, apparatuses A and B are the document managing apparatuses 200*a* and 200*b* equivalent to sub-retrieving apparatuses, a structured document DB "db1" in which one thousand reports are stored is present in the apparatus A, and a structured document DB "db2" in which user information is stored is present in the apparatus B.

As a premise of the explanation, the query data shown in FIG. 12 is inputted, the number of hits of retrieval results is 200, and an intermediate result in which two reporters of each of the reports are included is obtained. A size of a stored page is 4096 bytes.

FIG. 17 is a diagram for explaining an example of a table representing the intermediate result in this case. As shown in the figure, a table ID=10 is given to the table in which the intermediate result is stored. An ID of a node corresponding to "$rep//title/text" of items outputted as retrieval results is held in a column 0 of the table. An ID of a node corresponding to "$userinfo" is held in a column 1.

First, it is assumed that the plan generating unit 122 of the apparatus X generates the execution plan shown in FIG. 14 as an execution plan for outputting result data (step S1515). A meaning of this execution plan is as descried below.

A code of ID=1: Execute an operator "LoadText", acquire, in the apparatus A, a value of a structural element ID (TID)=1 stored in the column ID 0 of the table ID 10, and transfer the value to the apparatus X.

A code of ID=2: Execute the operator "LoadText", acquire, in the apparatus B, a value of a structural element ID (TID)=102 stored in the column ID 1 of the table ID 10, and transfer the value to the apparatus X.

A code of ID=3: Execute an operator "createXML" and generate result data from a value acquired.

Concerning a code for which data generation is performed among codes of the execution plan, the acquiring unit 123 acquires statistical information of a structural element to be retrieved (step S1504). For example, as described above, concerning the code of ID=2 in FIG. 14, the acquiring unit 123 acquires the average text size=192, the table flag=1, the average number of descendant nodes=6, the average document size=31600, the average number of stored pages=8, and the number of documents=1 as statistical information.

The associating unit 124 associates an expression format according to the rules in the rule storing unit 140 using the information on the query data, the statistical information acquired, and the information on the intermediate result (step S1505).

The code of ID=2 is considered as an example. A TID of a structural element to be transferred is 102. First, in the rule of the rule ID=1, the number of documents in which the structural element of the TID=102 is included is one. However, the average document size does not satisfy a condition "smaller than 4000 bytes". Thus, the rule is not applied.

In the rule of the rule ID=2, the number of documents in which the structural element of the TID=102 is included is one and the average document size satisfies a condition "smaller than 40000 bytes". The average number of stored pages of the document in which the structural element of the TID=102 is included is five and the average text size is 192 bytes. Thus, the average text size x the number of hits=192× (200×2)=76800 (bytes) and the number of stored pages×the page size=8×4096=32768 (bytes).

Therefore, a condition "the average text size×the number of hits>the number of stored pages×the page size" of the rule is satisfied. Consequently, since all the conditions of the rule of the rule ID=2 are satisfied, this rule is applied. In other words, the stored page format, which is the expression format of the rule of the rule ID=2, is associated with the execution plan as the expression format.

FIG. 18 is a table for explaining an example of the execution plan after the expression format is associated with the execution plan. In the code of ID=1, since there are no matching rules, the table format as the default format is set. In the code of ID=2, since the rule of the rule ID=2 is applied, the stored page format is set.

FIG. 19 is a diagram for explaining an example of an execution plan with which an expression format is associated by the conventional method. In the conventional method, since the table format is used as all the expression formats, the execution plan shown in the figure is obtained.

Finally, the plan executing unit 125 executes the respective codes using the execution plan associated with the expression format to generate result data (step S1507).

A data transfer amount in the conventional method and a data transfer amount in the method in this embodiment are compared. In the conventional method, since data is generated in the table format and transferred, a table that holds data obtained by converting user information of (200×2) people into character strings is transferred. Since the user information is data with an average 192 bytes, data transfer of at least (200×2)×192=76800 bytes is necessary.

On the other hand, according to the method in this embodiment, since stored pages for five pages are transferred, data transfer of 4096×8=32768 bytes only has to be performed. Therefore, according to the method in the embodiment, it is possible to reduce the data transfer amount compared with the conventional method.

When a size of text data of user information is larger or when more reporters included in reports are redundant, a higher reduction ratio of the data transfer amount is obtained.

As described above, in the structured-document retrieving system according to this embodiment, it is possible to select an expression format out of a set of a plurality of expression formats with reference to statistical information and the like of a retrieval object, generate an execution plan associated with expression formats selected for respective operators executed in retrieval processing, and perform generation of a character string and transfer of data in data formats in the expression formats selected. Therefore, it is possible to reduce the number of times of character string generation and a data transfer size. As a result it is possible to perform fast retrieval.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured-document retrieving system comprising:
a plurality of document managing apparatuses that store a plurality of structured documents, which have layered logical structures, in a distributed manner; and
a retrieving apparatus that is connected to the document managing apparatuses via a network and retrieves the structured documents from the document managing apparatuses, wherein
the retrieving apparatus includes:
a structure-information storing unit that stores, for each of the logical structures, statistical information of a structural element and a value in the structured documents corresponding to the logical structures;
a rule storing unit that stores a rule in which a condition of the statistical information and an expression format are associated with each other, the expression format being a format for representing a character string that includes a structural element and a value;
a plan generating unit that generates, based on a retrieval request for the structured document from a client terminal connected to the network, an execution plan of retrieval processing for the structured document;
an acquiring unit that acquires, from the structure-information storing unit, the statistical information corresponding to the logical structure to be retrieved of the execution plan generated;
an associating unit that acquires, from the rule storing unit, the expression format corresponding to the condition satisfied by the statistical information acquired and associates the expression format with the execution plan;
a plan transmitting unit that transmits the execution plan associated with the expression format to the document managing apparatuses;
a result receiving unit that receives a retrieval result, which is an execution result of the execution plan, from the document managing apparatuses; and
a first result transmitting unit that transmits the retrieval result to the client terminal, and
each of the document managing apparatuses includes:
a plan receiving unit that receives the execution plan associated with the expression format from the retrieving apparatus;
a plan executing unit that executes the execution plan received and outputs a retrieval result obtained by executing the execution plan in the expression format associated with the execution plan; and
a second result transmitting unit that transmits the retrieval result represented in the expression format to the retrieving apparatus.

2. The system according to claim 1, wherein
the rule storing unit stores the rule in which identification information of the document managing apparatuses in which the structured documents are stored, the condition, and the expression format are associated with one another,
the plan generating unit generates the execution plan including the identification information of the document managing apparatuses in which the structured documents as retrieval objects are stored,
the associating unit acquires, from the rule storing unit, the expression format corresponding to the identification information included in the execution plan generated and the condition satisfied by the statistical information of the logical structure to be retrieved of the execution plan generated and associates the expression format with the execution plan, and
the plan transmitting unit transmits the execution plan associated with the expression format to the document management apparatuses identified by the identification information included in the execution plan.

3. The system according to claim 1, wherein
the structure-information storing unit stores, for each of the logical structures, an average character string length of the character string as the statistical information,
the rule storing unit stores the rule in which the condition of the average character string length and the expression format are associated with each other, and
the associating unit acquires, from the rule storing unit, the expression format corresponding to the condition satisfied by the average character string length corresponding to the logical structure to be retrieved and associates the expression format with the execution plan.

4. The system according to claim 1, wherein
the structure-information storing unit stores an average number of the logical structures in the structured documents as the statistical information,
the rule storing unit stores the rule in which the condition of the average number of the logical structures and the expression format are associated with each other, and
the associating unit acquires, from the rule storing unit, the expression format corresponding to the condition satisfied by the average number of the logical structures to be retrieved and associates the expression format with the execution plan.

5. The system according to claim 1, wherein
the structure-information storing unit stores, for each of the logical structures, an average number of lower structures, which are the logical structures present in lower hierarchies of the logical structures, as the statistical information,
the rule storing unit stores the rule in which the condition of the average number of the lower structures and the expression format are associated with each other, and
the associating unit acquires, from the rule storing unit, the expression format corresponding to the condition satisfied by the average number of the lower structures of the logical structure to be retrieved and associates the expression format with the execution plan.

6. The system according to claim 1, wherein
the structure-information storing unit stores, when the structured documents are represented in a stored page format for storing the character string in stored pages in which information of a fixed length is stored, an average number of the stored pages as the statistical information,
the rule storing unit stores a rule in which the condition of the average number of the stored pages and the expression format are associated with each other, and
the associating unit acquires, from the rule storing unit, the expression format corresponding to the condition satisfied by the average number of the stored pages of the structured documents in which the logical structure to be retrieved is included and associates the expression format with the execution plan.

7. The system according to claim 1, wherein
the plan generating unit further generates, when the retrieval result received is an intermediate result obtained during retrieval processing, the execution plan based on the intermediate result received.

8. The system according to claim 7, wherein
the rule storing unit further stores the rule in which the condition of a number of the intermediate results and the expression format are associated with each other, and
the associating unit acquires, from the rule storing unit, the expression format corresponding to the condition satisfied by the number of the intermediate results and associates the expression format with the execution plan.

9. A structured-document retrieving method in a structured-document retrieving system including a plurality of document managing apparatuses that store a plurality of structured documents, which have layered logical structures, in a distributed manner, and a retrieving apparatus that is connected to the document managing apparatuses via a network and retrieves the structured documents from the document managing apparatuses, the structure-document retrieving method comprising:

generating, with the retrieving apparatus, based on a retrieval request for the structured document, an execution plan of retrieval processing for the structured document;

acquiring, with the retrieving apparatus, from a structure-information storing unit that stores statistical information of a structural element and a value in the structured documents corresponding to the logical structures for each of the logical structures, the statistical information corresponding to the logical structure to be retrieved of the execution plan generated;

acquiring, with the retrieving apparatus, from a rule storing unit that stores a rule in which a condition of the statistical information and an expression format are associated with each other, the expression format being a format for expressing a character string that includes a structural element and a value, the expression format corresponding to the condition satisfied by the statistical information acquired and associating the expression format with the execution plan;

transmitting, with the retrieving apparatus, the execution plan associated with the expression format to the document managing apparatuses;

receiving, with the document managing apparatuses, the execution plan associated with the expression format from the retrieving apparatus;

representing, with the document managing apparatuses, a retrieval result obtained by executing the execution plan received in the expression format associated with the execution plan;

transmitting, with the document managing apparatuses, the retrieval result represented in the expression format to the retrieving apparatus;

receiving, with the retrieving apparatus, a retrieval result, which is an execution result of the execution plan, from the document retrieving apparatuses; and transmitting, with the retrieving apparatus, the retrieval result to a client terminal.

10. A retrieving apparatus connected to, via a network, a plurality of document managing apparatuses that store a plurality of structured documents, which have layered logical structures, in a distributed manner, the retrieving apparatus comprising:

a structure-information storing unit that stores, for each of the logical structures, statistical information of a structural element and a value in the structured documents corresponding to the logical structures;

a rule storing unit that stores a rule in which a condition of the statistical information and an expression format are associated with each other, the expression format being a format for representing a character string that includes a structural element and a value;

a plan generating unit that generates, based on a retrieval request for the structured document from a client terminal connected to the network, an execution plan of retrieval processing for the structured document;

an associating unit that acquires, from the rule storing unit, the expression format corresponding to the condition satisfied by the statistical information of the logical structure to be retrieved of the execution plan generated and associates the expression format with the execution plan;

a plan transmitting unit that transmits the execution plan associated with the expression format to the document managing apparatuses;

a result receiving unit that receives a retrieval result, which is an execution result of the execution plan, from the document managing apparatuses; and a result transmitting unit that transmits the retrieval result to the client terminal.

* * * * *